United States Patent [19]

Schneider et al.

[11] 4,053,292
[45] Oct. 11, 1977

[54] GAS SCRUBBING PLANT

[75] Inventors: Jurg Schneider, Muttenz; Volker Fattinger, Arlesheim, both of Switzerland

[73] Assignee: Ciba-Geigy Corporation, Ardsley, N.Y.

[21] Appl. No.: 694,754

[22] Filed: June 10, 1976

[30] Foreign Application Priority Data

June 13, 1975 Switzerland .................. 7697/75

[51] Int. Cl.² .............................................. B01D 47/06
[52] U.S. Cl. ......................................... 55/227; 55/229; 55/242; 55/257 PV; 55/440; 55/424
[58] Field of Search .............. 55/89, 93, 94, 96, 227, 55/229, 242, 257 R, 257 PV, 257 QV, 257 M, 257 PP, 440, 442–446, DIG. 37, 392, 424; 261/108; 98/121 R

[56] References Cited

U.S. PATENT DOCUMENTS

| | | | |
|---|---|---|---|
| 700,859 | 5/1912 | Thomas | 55/257 PV |
| 1,870,196 | 8/1932 | Hegan | 55/242 |
| 2,513,174 | 6/1950 | Hess | 55/96 |
| 3,522,000 | 7/1970 | Kinney | 55/242 |
| 3,925,040 | 12/1975 | Fattinger | 55/440 |

FOREIGN PATENT DOCUMENTS

| | | | |
|---|---|---|---|
| 106,083 | 11/1926 | Austria | 55/440 |
| 1,210,379 | 3/1960 | France | 55/444 |

Primary Examiner—Frank W. Lutter
Assistant Examiner—David L. Lacey
Attorney, Agent, or Firm—Harry Falber

[57] ABSTRACT

A drop trap for a gas scrubbing plant, the trap having a plurality of parallel spaced apart corrugated plates forming channels through which gas flows and baffles at the downstream side of the corrugated plates to impart a downward velocity to liquid particles entrained in the gas flowing through the channels. Further baffles may be located at the upstream side of the corrugated plates to deflect the liquid particles downwardly to flow over the corrugated plates as they are separated from the gas as it passes through the channels. A method is also disclosed of rinsing the corrugated plates by intermittently spraying a predetermined quantity of liquid over the upstream side of the plates.

21 Claims, 4 Drawing Figures

GAS SCRUBBING PLANT

FIELD OF THE INVENTION

This invention relates to apparatus for purification of a stream of gas, comprising at least one scrubbing stage and at least one drop trap downstream of said stage, for separating the scrubbing liquid. The drop trap comprises substantially parallel and vertical separator plates which are corrugated or bent zig-zag fashion in horizontal section and which together form interstices through which the gas is required to flow from an entry side to an exit side.

PRIOR ART

In prior art drop traps of this type, the gas flows horizontally through the flow paths. Given sufficiently high velocities of flow, the liquid particles of higher specific gravity in the gas are subjected to relatively high centrifugal forces in the curved flow sections so that the liquid particles are directed towards the walls of the flow paths where they should flow down as quickly as possible.

It has been found in practice that although the liquid particles entrained in the gas flow nearly always impinge on the flow path boundary walls, the particles do not simply flow down but, to some extent, rebound directly from the walls back into the gas stream or else are entrained by the relatively rapid gas stream on their path down the boundary walls.

These problems have been, to a large extent, solved by a drop trap with specially profiled separator plates as just disclosed recently, for example, in German Offenlegunsschrift DOS No. 2 324 520. In this and, to some extent, all other known drop traps of the type described hereinabove, relatively long entry and exit flow paths are required upstream and downstream of the drop trap for reasons associated with flow technology. The emerging gas stream is required to flow away horizontally without obstruction over a long distance, particularly at the exit side of the drop trap and if this is not so, the drop trap efficiency drops very rapidly, i.e. the emerging gas stream still contains a large number of liquid droplets. This of course is particularly disadvantageous in practice in cases where space is restricted.

OBJECT OF THE INVENTION

Accordingly, one of the main objects of the invention is to provide in a gas scrubbing plant a drop trap which allows high throughputs and requires only a small space. More particularly, the drop trap is designed so that its efficiency is substantially independent of the flow conditions in the entry and exit zones.

SUMMARY OF THE INVENTION

To this end, according to the invention, flow guide means are disposed on the exit side substantially outside the separator plates to transmit a downwardly directed velocity component to the gas flow inside the drop trap at least near its exit side.

The invention also relates to a method of operating a gas scrubbing plant wherein at least 5 liters of rinsing liquid per second and per square meter of entry cross-section are sprayed intermittently into the drop trap to rinse the separator plates.

BRIEF DESCRIPTION OF THE DRAWINGS

An embodiment of apparatus according to the invention will now be described in detail with reference to the accompanying drawings in which.

DETAILED DESCRIPTION OF PREFERRED EMBODIMENT

Figure 1:
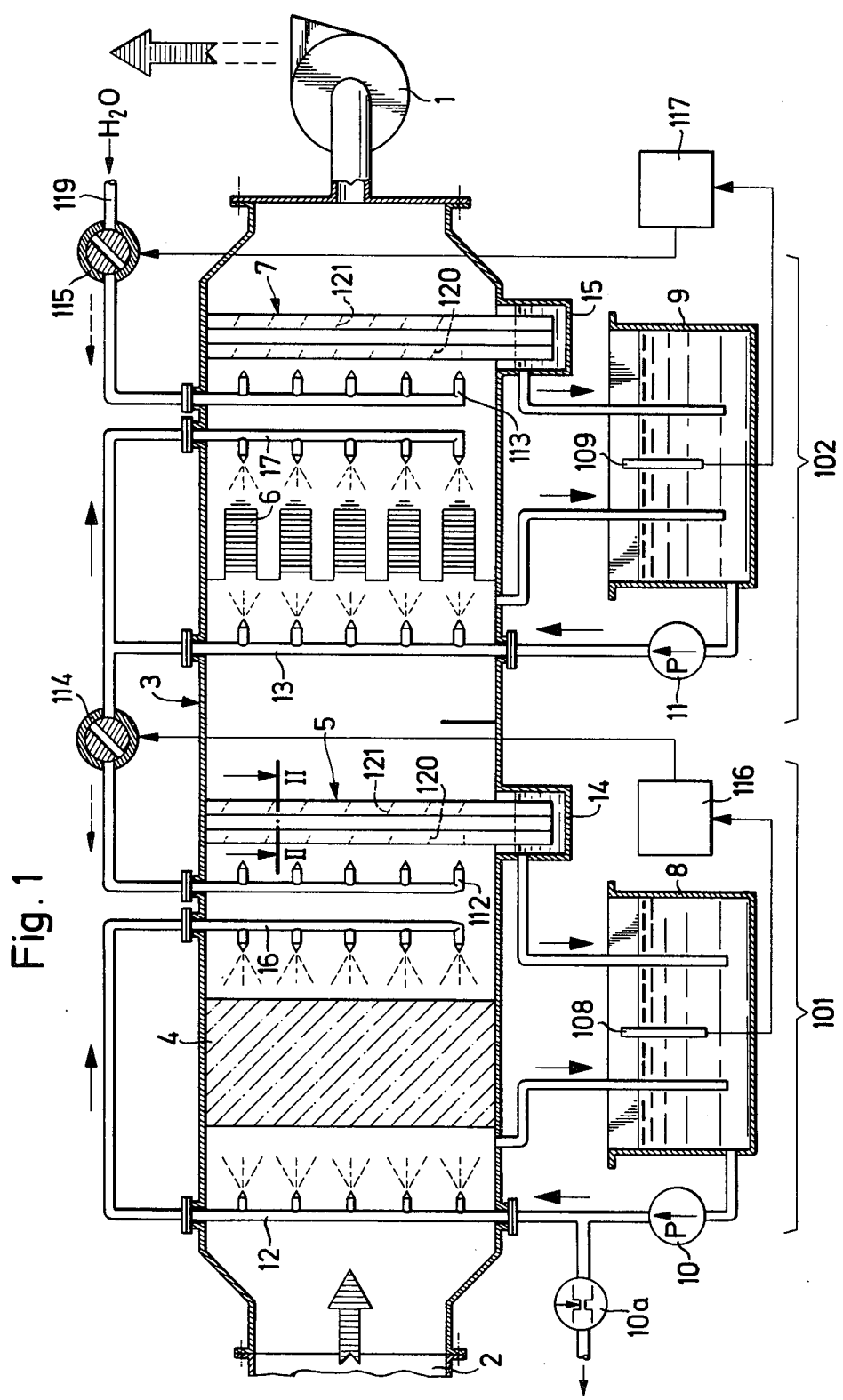
FIG. 1 is a diagram showing a two-stage scrubber plant incorporating drop traps.

The gas to be scrubbed is drawn in by a blower 1 and enters a scrubber 3 at an inlet aperture 2. After the gas has passed through a first contact zone 4 in which there is a mass transfer from the gas to the scrubbing medium, it flows to a first drop trap 5 where the entrained scrubbing liquid particles are separated. From there the gas is fed to a second contact zone 6 and is scrubbed a second time. The recently entrained liquid particles are then separated in a second drop trap 7 so that the purified gas can finally be discharged by the blower.

The scrubbing liquid which is kept in tanks 8 and 9 is fed by pumps 10 and 11 to spray systems 12 and 13 upstream of the contact zones 4 and 6 respectively and after separation in the drop traps flows back to the tanks in the direction of the arrows via collector ducts 14, 15 respectively disposed beneath the drop traps.

A relatively small quantity of contaminated scrubbing liquid is continuously discharged via an adjustable throttle 10a from the scrubbing liquid circuit forming part of the first scrubbing stage having the general reference 101. The scrubbing liquid is replenished via another spray system 112 which is disposed upstream of the first drop trap 5 and which is connected to the scrubbing liquid circuit of the second scrubbing stage 102 via a solenoid valve 114. Similarly, another spray system 113 is disposed upstream of the second drop trap 7 and is connected via a solenoid valve 115 to a reservoir (not shown) for uncontaminated scrubbing liquid, e.g. water.

The two spray systems 112, 113, are used for rinsing the drop traps downstream thereof. The rinse cycle consists of relatively short periods of actual rinsing separated by substantially regular, lengthy intervals of non-rinsing. The amount of liquid sprayed into the gas or directly into the drop trap is relatively large in comparison with the normal amount of liquid in the stream of gas. To ensure an adequate rinsing effect, the amount of liquid with respect to the cross-section of the gas flow as measured perpendicularly to the gas flow entering the drop trap should be at least approximately 5 liters per second per square meter of cross-sectional entry area of the drop trap. The spray systems 112, 113 and the output of the pump 11 and the pressure in the fresh water supply line 119 are arranged accordingly.

It has been found in practice that a 10-second rinse recurring regularly at intervals of about 1 hour, for example, is quite sufficient to keep the drop traps clean and hence in working order over very long periods of operation even in the case of highly polluted gases.

During the rinsing operation it is usually not possible to separate all the liquid from the gas flow but this is not important since the rinsing liquid of the last drop trap is in any case practically clean. Also, the last drop trap may be followed by an additional drop trap which separates the liquid still contained in the gas during rinsing. This additional drop trap need not be rinsed itself because it has to separate only practically clean rinsing liquid and accordingly does not become soiled.

As will also be apparent from FIG. 1, the two solenoid valves 114, 115 are each connected to control systems 116, 117 respectively which are in turn each connected to a level sensor 108, 109 in the tanks 8, 9 respectively. If the level in either tank drops below a minimum value, e.g. due to evaporation or discharge of contaminated liquid through the throttle 10a or branch line into the spray system of the first scrubbing stage, the valve 114 or 115 is opened and the drop trap 5 or 7 is rinsed. In these conditions, liquid is fed to the tank 8 or 9 via the collecting ducts beneath the drop traps until the level has risen to its desired value again. With the liquid throughput indicated above as necessary for rinsing, rinsing takes only a few seconds provided that the minimum level which triggers it is not set too low. The intervals of time between each two rinses are determined substantially by the evaporation rate and the throttle 10a and are adjustable by means of the latter.

The above-described type of rinsing of the drop traps is, in principle, applicable to practically any type of drop trap. However, it has proved particularly effective and advantageous in connection with the special drop trap explained in detail hereinafter.

Figure 2:
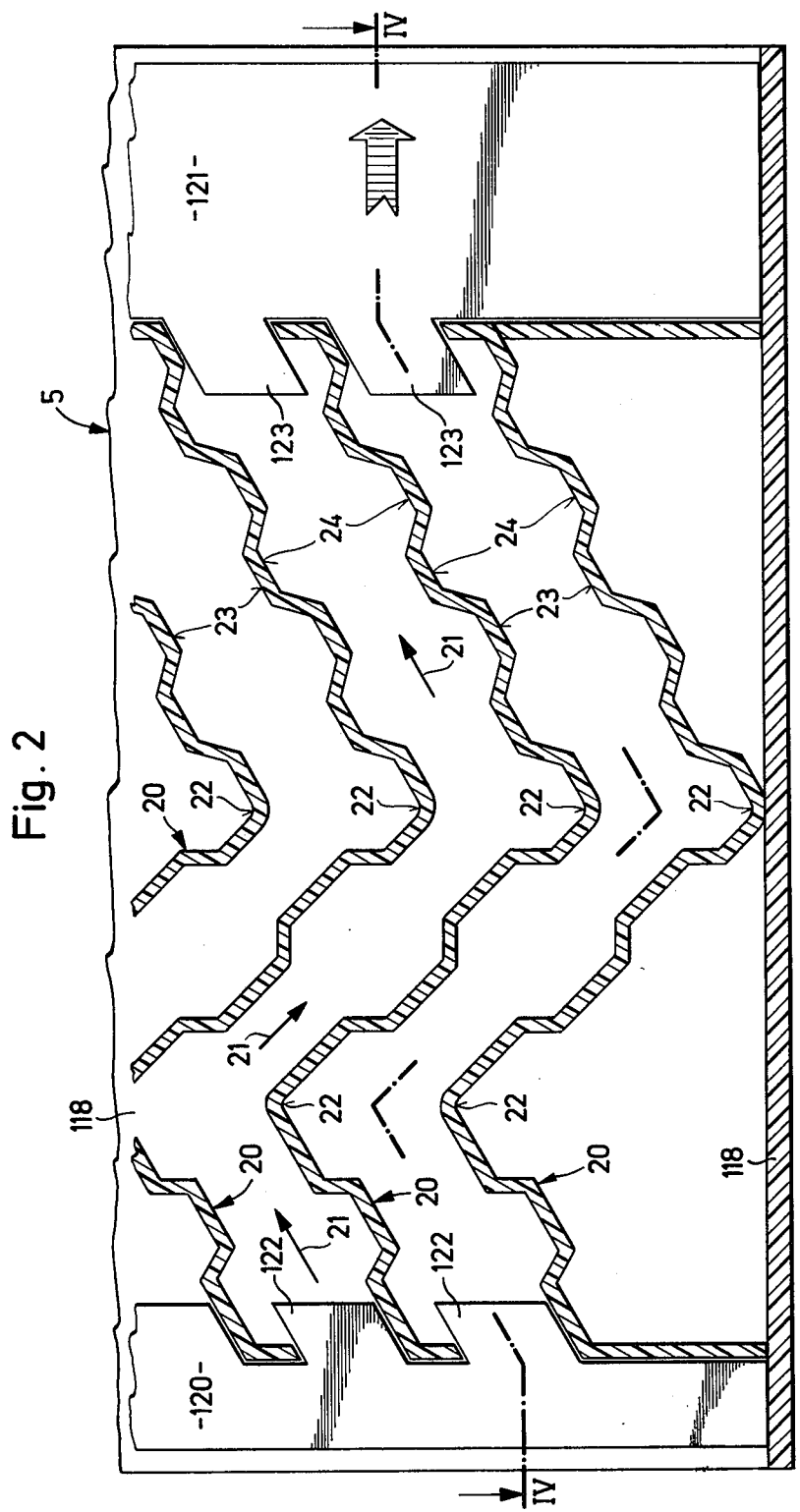
FIG. 2 is an enlarged scale section of a drop trap on the line II — II in FIG. 1.
Figure 4:
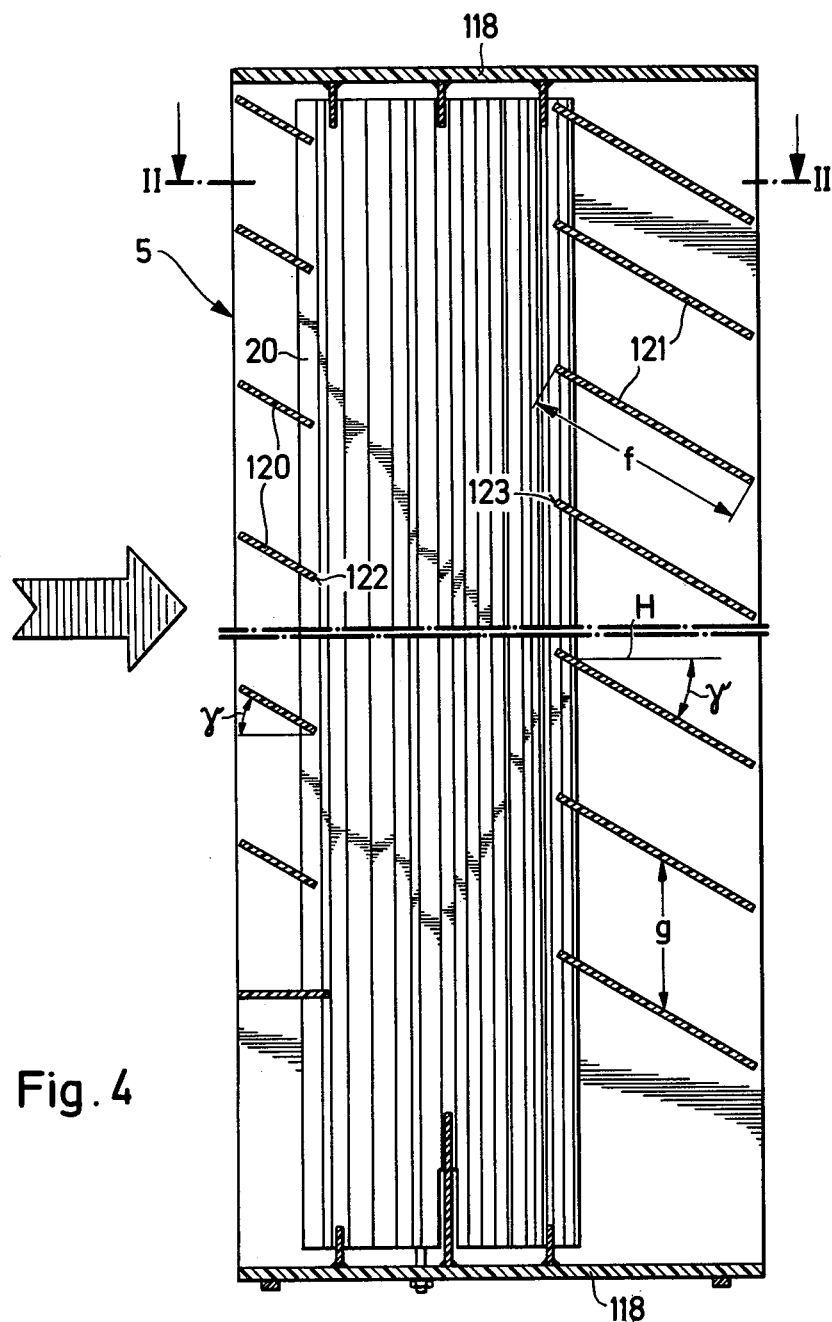
FIG. 4 is a section on the line IV — IV in FIG. 2.

The two drop traps 5 and 7 are of identical construction and are shown in detail in FIGS. 2 and 4. Each drop trap has a series of corrugated separator plates vertically disposed in spaced parallel relationship to one another in a frame 118. The plates are bent in zig-zag fashion and form between each pair of plates interstices through which the gas flows, each plate having two deflection points or bends. Flat baffle plates 120, 121 extending parallel to each other and transversely of the plates 20 are disposed respectively on the entry and exit sides of the drop traps and are inclined downwardly in the direction of flow by an angle $\gamma$ of about 30° to the horizontal H. The edges of the baffle plates are provided with projections 122, 123 which engage comb-fashion between the individual separator plates 20 so that no other spacer means are required to hold the separator plates apart.

The baffle plates 120, 121 could alternatively be located at a distance upstream or downstream of the drop traps. Such distance should not exceed the rectilinearly measured length $l$ (FIG. 3) of the separator plates.

The baffle plates 120 and 121 deflect the gas stream entering and emerging from the interstices between the separator plates 20 downwardly at an angle. The gas flow thus has a downwardly directed velocity component imparted to it in the drop trap and the effect of this is that the liquid droplets separated from the stream of gas and deposited on the separator plates flow down perfectly. The baffle plates also make it possible for the flow conditions in the drop trap to be controlled substantially independently of the length and shape of the entry and exit flow paths upstream and downstream of the drop trap so that a better efficiency can be obtained particularly where space makes only very short exit flow paths available. Suitable angles of deflection from the horizontal have proved in practice to be angles $\gamma$ between 10° and 50°, more particularly more than 20° and preferably between about 25° and 40°.

The length $f$ of the baffle plates can be chosen within wide limits and is not critical. Generally, however the length of the baffle plates on the exit side will be larger than the length on the entry side. In any case it has been found surprisingly that the baffle plates on the entry side are of only secondary importance and in some cases may be omitted. The main effect is provided by the baffle plates on the exit side. Their effect is particularly favorable if their lengths $f$ are related to their spacing $g$ as to give the relationship $g/f \leq \sin \gamma$.

The flat baffle plates 120, 121 may be replaced by any other flow guide means, e.g. cylindrically curved plates or blades or the like.

Figure 3:
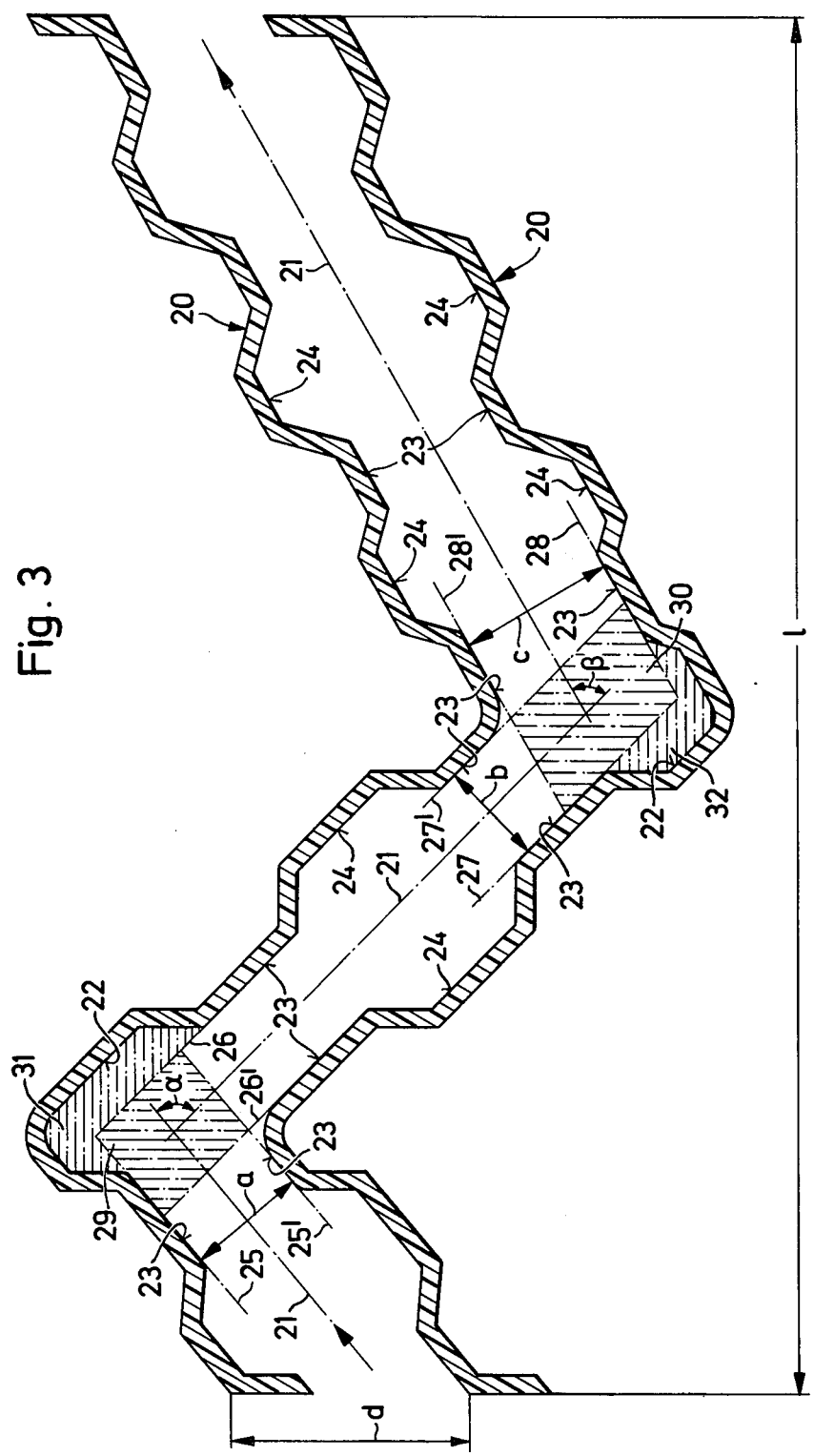
FIG. 3 is a detailed view of two of the separator plates shown in FIG. 2.

Although the above-described efficiency-increasing effect of the baffle plates 120, 121 occurs with practically all known separator plates, the combination of baffle plates and separator plates shown in FIGS. 2 and 3 has proved particularly advantageous and effective in practice. The reason for this is that it is precisely with this type of drop trap that the entry and exit flow conditions are particularly critical because the separator plates are relatively far apart for other reasons. Drop traps with closely spaced separator plates give rise to less problems in this respect. The arrangement of flow guide means as described above considerably increases the efficiency and economy of a drop trap formed from separator plates having the cross-section shown. As a result of these steps the individual separator plates can be moved even farther apart without impairing efficiency so that for the same efficiency less separator plates are required. It has been found that the possible inter-plate spacing $d$ may be considerably more than one-twelth of the length $l$ of the plates (FIG. 3).

Further details of the separator plates 20 will be apparent from FIG. 3, which shows two separator plates. It will be seen that each pair of plates defines a gas flow passage composed of substantially rectilinear portions between each pair of which there is an angled bend. At these bends the gas stream is deflected relatively abruptly through a relatively large angle. In view of the straight flow portions we may refer to a main direction of flow upstream and downstream of each bend and this is shown by the chain-dotted line 21 in the drawing.

Pockets 22 in the bends are the most important feature of the plates 20. These pockets extend over the entire height of the plates and thus form vertical ducts in which a large amount of the liquid droplets separated from the current of gas can flow off. These pockets 22 are situated only at the outsides of the bends. Between the pockets 22, i.e. in front of and after such pockets, each plate has a trapezoidal profile such that the flow path defined by each pair of plates alternately narrows and widens out. A constriction 23 is provided in front of and after each angled bend. The passages also have widened portions 24. Where identically shaped plates are used throughout the trap, the trapezoidal profiling thereof enables the flow passages to narrow and widen out practically without exception symmetrically to the line 21 which also indicates the centre line between two plates.

Referring to the horizontal section through the drop trap of FIG. 3, there are shown lines 25 and 25' parallel to the direction of flow immediately before the first bend and respectively touching the outer and the inner plates defining the passage immediately before the first bend, while lines 26 and 26' are parallel to the direction of flow immediately after the first bend and touch the outer and inner plates immediately after the first bend. Lines 25, 25', 26, 26' bound a parallelogram 29, and lines 25, 26 and the inside of the outer plate bound the cross-sectional area 31 of pocket 22 of the first band. Lines 27, 27', 28, 28', parallelogram 30 and cross-sectional area 32 of pocket 22 of the second bend are in a similar relationship to the second bend as are lines 25, 25', 26, 26', parallelogram 29 and cross-sectional area 31 to the first bend.

It has been found that in order to obtain a high degree of separation of liquid, the cross-sectional area 31, 32 of each pocket 22 should be at least 8%, and preferably between 30 and 60% of the area of the parallelogram 29, 30 of its associated bend. The pockets must cover the entire bend, i.e. extend on both sides of the corner of the bend, as shown in the drawing.

It will also be apparent from FIG. 3 that prior to each bend the plates are so shaped that the gas stream is directed towards the respective pocket. At the first bend practically the entire gas stream is directed towards the pocket, while this is only partly the case at the second bend.

The angled bend on the one hand, and the guidance of the gas stream towards the pocket associated with that bend causes the liquid droplets to be brought to the walls of the pockets, and said droplets can then flow down in the ducts formed by the pockets without being entrained again by the gas stream.

For optimum efficiency of the drop trap it is important that the angle of the first bend is greater than the angles of subsequent bends downstream of it. In most cases the separating effect of the drop trap is such that two bends are quite sufficient for practically complete removal of the droplets from the gas. In cases where this is not sufficient, it is of course possible to use plates providing further bends. In such a case, the angles of the bends after the first may all be of the same size or may advantageously successively decrease. The best results are obtained if the angle $\alpha$ of the first bend is at least 70° and is not much more than 120°. With such an arrangement most of the liquid contained in the gas is then already separated at the first bend so that subsequent bends can be angled much less sharply. Advantageously, the angle of bends downstream of the first is at least 10°, and preferably 15° to 20°, less than $\alpha$. The less sharp downstream bend(s) after the first avoid excessive resistance of the drop trap to flow.

The gas stream acceleration produced by the constrictions in front of each deflection point also contribute to the high efficiency of the drop trap. It has been found advantageous for the inside width $b$ of the constriction before the second bend to be less than the inside width $a$ of the constriction before the first bend. It is also advantageous for the inside width $c$ of the constriction after the second bend to be greater than that of the two constrictions before the second bend. It has been found that a very high separation efficiency can be obtained if the speed of the gas stream in the drop trap is accelerated to about 1.6-3.4 times the speed upstream of the same. This can be achieved by appropriate dimensioning and spacing of the plates, since the acceleration depends only on the geometry of the drop trap.

The special shape of the plates gives the drop trap an efficiency such that the plates do not have to be wettable by the liquid which is to be separated. This is of course a considerable advance and advantage, since these plates can now be made of a cheap plastic and the drop trap can be used in a wider range of applications.

It has been found that ultra-fine droplets are very much more difficult to separate from the gas stream than larger liquid particles. When a gas stream has only a relatively low liquid content, only very few of the droplets — which are then very fine — are separated. It has now been found that even gas streams having a very low liquid content can have the liquid removed effectively provided that they are additionally charged with the same or another liquid before entry to the drop trap. It is easiest to separate from the gas stream those drops which sink or fall at a speed of between 8 and 200 cm per second in the stationary gas.

The amount of liquid to be additionally injected into the gas stream before it enters the drop trap naturally depends on the type of contact zones in front of the drop trap and on the speed of flow of the gas. If enough drops of the correct size are already present in the gas after the contact zones, the gas can of course be fed directly to the drop trap. Otherwise it is preferable to use pressure atomising nozzles at a pressure of about 2 to 4 bars to inject an amount of scrubbing liquid or water into the gas such as to give a total liquid content of 3 g/m³ to 500 g/m³. Thus it has been found that a total content of 500 g/m³ before the drop trap gives a residual liquid content of less than 5 g/m³. With a much lower total content of 3 g/m³, the residual liquid content was admittedly somewhat higher but it was still very low, being 20 g/m³.

In FIG. 1 the additional liquid injection in front of the drop trap is provided by the spray devices 16 and 17.

What is claimed is:

1. An apparatus for purification of a stream of gas, comprising a gas inlet, a gas outlet, and, therebetween, at least one scrubbing stage and at least one drop trap downstream of the said stage for separating the scrubbing liquid from the gas, the drop trap comprising an entry and an exit for the gas and a plurality of vertically spaced corrugated separator plates extending substantially parallel to one another and defining horizontal gas flow passages therebetween which extend from the entry to the exit and through which the gas is required to flow, and flow guide means disposed on the exit of the drop trap substantially outside the separator plates and extending across the latter to transmit a downwardly directed velocity component to the gas flow inside the drop trap at least near its exit.

2. Apparatus according to claim 1, which also comprises a first spray device positioned between said scrubbing stage and said at least one drop trap and first feed means for conveying liquid to said first spray device, said first feed means and said first spray device delivering liquid to the gas such that the liquid content thereof is at least 3 g/m³.

3. Apparatus according to claim 2, which also comprise a second spray means located near the entry of the drop trap, a second feed means for conveying liquid to said second spray means and a control means controlling said second feed means so that, at given intervals, at least 5 liters of liquid per second and per square meter of drop trap entry area are delivered to said second spray means.

4. Apparatus according to claim 3 further including a tank for scrubbing liquid and a lever sensor disposed in said tank, said control means including a circuit responsive to said level sensor and triggering said second feed means when the level in the tank drops to a predetermined minimum level.

5. A drop trap for separating liquid from a gas stream, comprising an entry and an exit for the gas and a plurality of vertically spaced corrugated separator plates extending substantially parallel to one another and defining horizontal gas flow passages therebetween which extend from the entry to the exit and through which the gas is required to flow, and flow guide means disposed on the exit of the drop trap substantially outside the separator plates and extending across the latter to transmit a downwardly directed velocity component to the gas flow inside the drop trap at least near its exit.

6. A trap according to claim 5, wherein the flow guide means are arranged and adapted so as to deflect the gas stream emerging from the exit downwards at an angle and are disposed at a distance therefrom not exceeding the rectilinearly measured distance between the entry and exit of the drop trap.

7. A trap according to claim 6, wherein the flow guide means are disposed immediately after the separator plates.

8. A trap according to claim 6, wherein at least part of the flow guide means are disposed between the separator plates.

9. A trap according to claim 5, including second flow guide means located at the entry of the drop trap.

10. A trap according to claim 5, wherein the flow guide means are adapted so as to deflect the gas stream downwards at an angle of about 10° to 50° with respect to the horizontal.

11. A trap according to claim 10, wherein the flow guide means are adapted so as to deflect the gas flow downwards at an angle between 25° and 40° to the horizontal.

12. A trap according to claim 2, wherein said flow guide means comprise a plurality of baffle plates extending transversely of the separator plates at the exit of the drop trap and inclined downwardly in relation to the direction of gas flow through said passages.

13. A trap according to claim 12, wherein the baffle plates engage the separator plates to maintain them a predetermined distance apart.

14. A trap according to claim 12, wherein the distance $d$ between each two separator plates is at least one fifteenth of the rectilinearly measured distance between the entry and exit of the trap.

15. A drop trap according to claim 5, wherein said separator plates each have in a horizontal section a zig-zag configuration and each said passage has at least two angled bends therein;

said plates being shaped to form a pocket on the outer side of each bend extending on both sides of the corner of the bend and substantially over the entire height of the respective plate and being positioned prior to each bend such that the passage defined therebetween opens into said pocket for at least partially guiding the gas flow into the associated pocket; the angle of the first of said bends being greater than the angle of the second of said bends immediately adjacent and after said angles being defined by the juncture of the respective center-lines of the flow passages prior to and after said bends; and the pocket formed in at least a first of said bends in each passage having a horizontal cross-sectional area of at least 8% of the area of a parallelogram associated with said first bend, the parallelogram being defined by four horizontal lines with first and second of said lines being parallel to the center-line of the flow passage immediately prior to said first bend and touching respectively the inner surface of the plate forming said pocket and the inner surface of the other plate defining the passage immediately before said first bend, and with third and fourth of said lines parallel to the center-line of the flow passage immediately after said first bend and touching respectively the inner surface of the plate forming said pocket and the inner surface of the other plate defining the passage immediately after said first bend, and the cross-sectional area of the pocket at said first bend being defined by the inner surface of the plate which forms the pocket at the said first bend and by said first and third lines of said parallelogram which touch the inner surface of the pocket forming plate.

16. A drop trap according to claim 15, wherein the second bend is angled in the opposite sense to the first bend.

17. A drop trap as in claim 15, wherein the pocket formed in at least a first of said bends has a horizontal cross-sectional area of between 30% and 60% of the area of said parallelogram associated with said bend.

18. A drop trap as in claim 15, wherein a constriction in the passage is provided both before and after each bend, the constriction before said first bend having a greater inside width than the constriction before said second bend.

19. A drop trap as in claim 18, wherein the constriction after the second bend has a greater inside width than the two preceding constrictions in the passage.

20. A drop trap according to claim 15, wherein the angle of the first bend is at least 70° and not greater than 120° and wherein the angle of the first bend is at least 10° greater than the angle of bends coming thereafter.

21. A drop trap as in claim 20, wherein the angle of the first bend is between 15° and 20° greater than the angle of subsequent bends downstream of it.

* * * * *